United States Patent [19]

Shimomura et al.

[11] Patent Number: 4,893,230

[45] Date of Patent: Jan. 9, 1990

[54] PHYSICAL QUANTITY CONTROLLER

[75] Inventors: Tooru Shimomura, Muko; Kazutomo Naganawa, Suita; Toshiya Tanamura, Takatsuki; Toshiaki Nagao, Kyoto, all of Japan

[73] Assignee: Omron Tateisi Electronics Co., Kyoto, Japan

[21] Appl. No.: 172,438

[22] Filed: Mar. 24, 1988

[30] Foreign Application Priority Data

Sep. 30, 1987 [JP] Japan .................................. 62-80341

[51] Int. Cl.⁴ .............................................. G06F 15/46
[52] U.S. Cl. .................................... 364/146; 364/180; 364/188; 364/144; 340/309.15
[58] Field of Search ............... 364/146, 150, 188, 189, 364/474.22, 474.23, 474.27, 144.45; 340/309.15; 358/192.1, 194.1; 455/151, 171, 181

[56] References Cited

U.S. PATENT DOCUMENTS 4,636,963  1/1987  Nakajima et al. ................... 364/479
4,685,064  8/1987  Kinoshita et al. ................... 364/474

OTHER PUBLICATIONS

Zenith System 3 Color TV operating guide, pp. 8–13.

Primary Examiner—John R. Lastova
Attorney, Agent, or Firm—Stevens, Davis, Miller & Mosher

[57] ABSTRACT

A physical quantity controller is provided which includes numeral updating keys, a mode changing key, and a display unit. A value displayed on the display unit is updated via the numeral updating keys. The updated value is automatically set as a new set point or alarm point when a predetermined time elapses after the updating keys are actuated.

7 Claims, 4 Drawing Sheets

FIG. 4
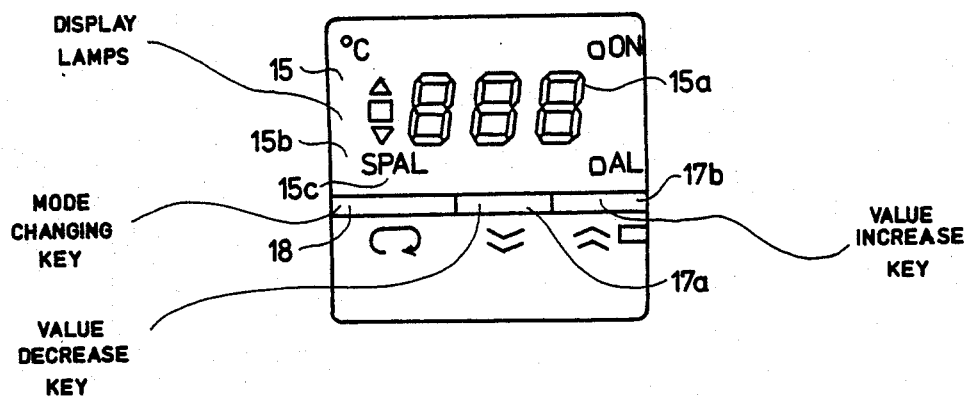
FIG. 5
FIG. 7
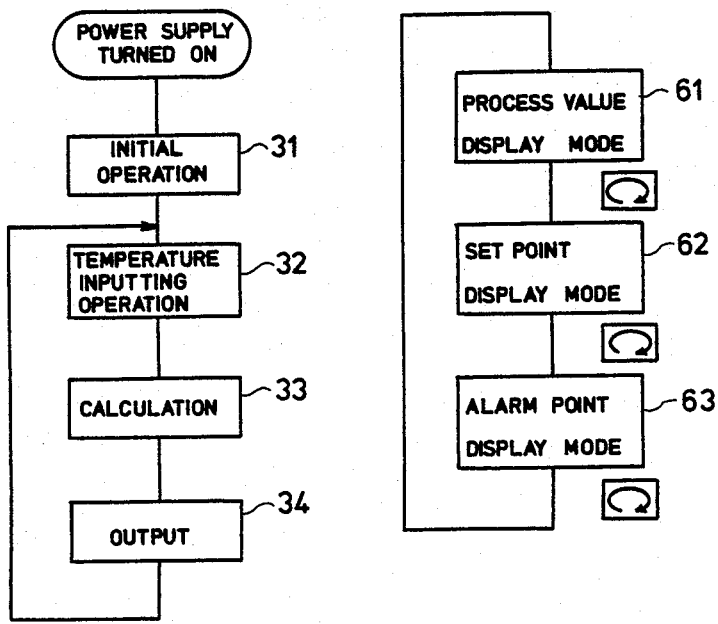

PHYSICAL QUANTITY CONTROLLER

BACKGROUND OF THE INVENTION

1. Field of the Invention

This invention relates to a physical quantity controller, and more particularly, to a physical quantity controller which employs a microprocessor for control.

2. Discussion of the Related Art

In conventional controllers which employ a microprocessor, a value is displayed on a display unit using an input key. Thereafter, the value is inputted into the controller using a return key.

Thus, in such conventional controllers, the return key is required to input the value into the controller. In other words, the value cannot be automatically inputted into the controller. Also, such conventional controllers have a large number of key, resulting in a complicated structure.

SUMMARY OF THE INVENTION

It is, therefore, an object of this invention to provide a physical quantity controller which allows automatic input of values after they are displayed.

It is another object of this invention to provide a simplified physical quantity controller.

According to this invention, there is provided a physical quantity controller which includes (1) a display unit including a numeral display area for displaying a numeral thereon, (2) a numeral updating unit for updating a numeral displayed on the numeral display area, (3) a mode changing unit for changing display modes of the display unit, (4) a storage unit which includes an input buffer for temporarily storing a numeral updated by the updating unit, a counter for counting time elapsing after actuation of the numeral updating unit, and a storage area for storing a value relating to the physical quantity, and (5) a writing unit for writing the updated numeral stored in the input buffer into the storage area as a new value when the counter reaches a predetermined number after the numeral updating unit has been actuated.

BRIEF DESCRIPTION OF THE DRAWINGS

The above and other objects, advantages and features of this invention will be more fully understood when considered in conjunction with the following figures, in which like numerals designate like or corresponding components and of which:

FIG. 4 is a front view of a front panel used in the preferred embodiment of this invention;

FIG. 5 is a flow chart presenting a schematic operation of the preferred embodiment of this invention;

FIG. 7 is a flow chart representing the operation mode changing sequence according to the invention.

DETAILED DESCRIPTION OF THE INVENTION

Figure 1:
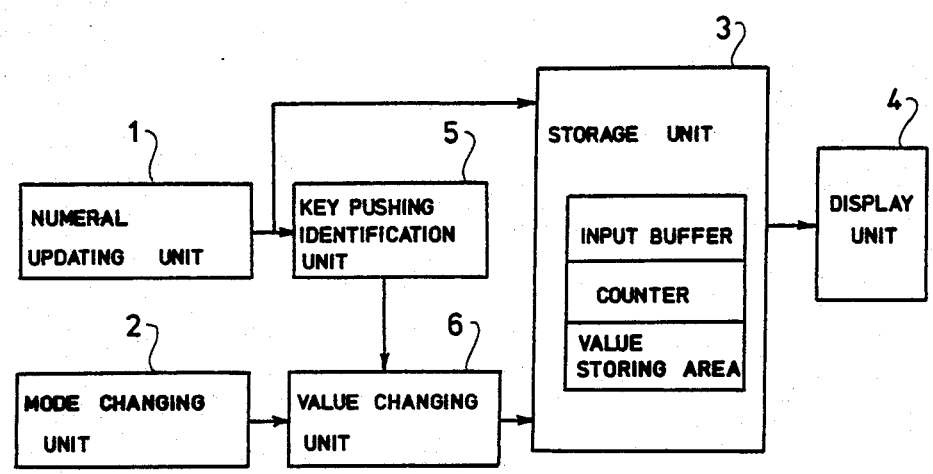
FIG. 1 is a schematic view of a preferred embodiment of this invention.

FIG. 1 is a schematic view of a temperature controller according to a preferred embodiment of this invention. Numeral updating means 1 is connected to key pushing identification means 5 and to storage means 3. Mode changing means 2 is connected to value changing means 6 which is dedicated to storage means 3. Storage means 3 includes an input buffer area, a counter area and a value storing area. Key pushing identification means 5 is connected to value changing means 6. Data to be displayed is sent from storage means 3 to display means 4.

Figure 2:
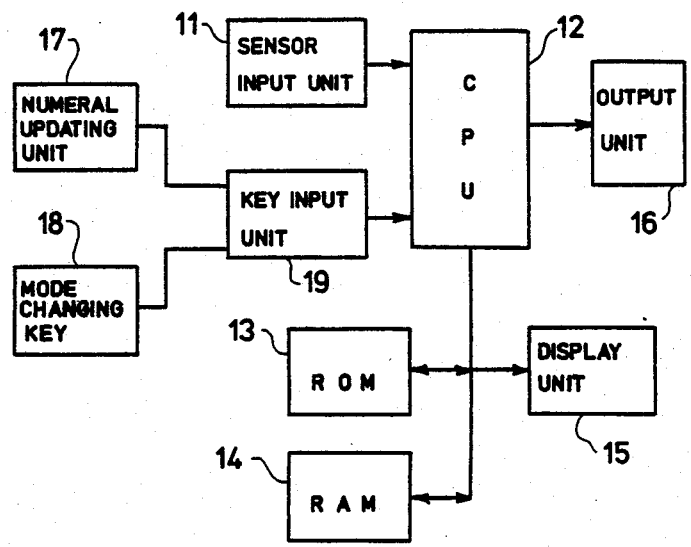
FIG. 2 is a detailed circuit diagram of the preferred embodiment of this invention.

FIG. 2 is a circuit diagram of the temperature controller according to the preferred embodiment of this invention. A sensor input unit 11 receives analog signals from a temperature sensor (not shown), converts them into digital signals, and sends the digital signals to a CPU (Central Processing Unit) 12. A ROM (Read Only Memory) 13 and a RAM (Random Access Memory) 14 are provided as storage means 3 and are dedicated to CPU 12. A display unit connected to CPU 12 is provided as a display means, which displays a process value (current temperature), a set point (target temperature) and an alarm point (alarm temperature). In addition, numeral updating unit 17 connected to CPU 12 is provided as a numeral updating means 1, which updates a displayed value. Further, a mode changing key 18 connected to CPU 12 constitutes a mode changing means 2, which is used to change the display modes of display unit 15.

Figure 3:
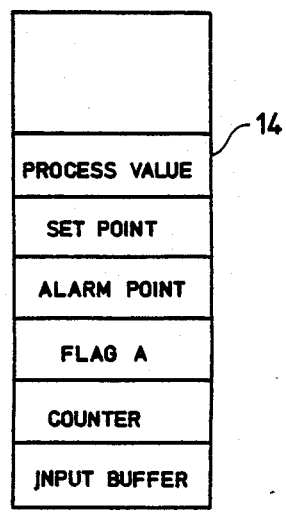
FIG. 3 is a memory map of a RAM (Random Access Memory) used in the preferred embodiment of this invention.

FIG. 3 represents a memory map showing the contents of RAM 14 of the temperature controller embodiment. RAM 14 has six storage areas. The first is a process value area which stores a process value (current temperature) which is entered into CPU 12 through sensor input unit 11. The second is a set point area which stores a set point (target temperature), and the third is an alarm point area which stores an alarm temperature. The fourth area contains a flag A which indicates whether or not numeral updating unit 17 is being operated. The fifth area is allocated to a counter which counts the time which has elapsed after numeral updating unit 17 has been put into operation. The sixth area is an input buffer which temporarily stores the updated temperature value. In a set point display mode, the value in the input buffer is displayed as a set point on a temperature display area of display unit 15, and in an alarm point display mode, the value in the input buffer is displayed as an alarm temperature.

FIG. 4 is a front view of the temperature controller embodiment. Display unit 15 is disposed on the upper part of the front face of the controller as shown. Display unit 15 includes a numeral display area 15a for displaying a temperature value, and also includes two display lamps 15b (SP) and 14c (AL). Lamp 15b indicates that a set point is displayed on numeral display area 15a, and lamp 15c indicates that an alarm point is displayed on numeral display area 15a. Numeral updating unit 17 and mode changing key 18 are disposed on the lower part of the front face. Numeral updating unit 17 includes a key 17a which is used to decrease a value displayed on numeral display area 15a, and a key 17b which is used to increase a value displayed on display area 15a. The lower marks "C", "∀", and "A" correspond to mode changing key 18 and keys 17a and 17b, respectively.

The operation of the temperature controller is described below with reference to the flow charts shown in FIGS. 5 to 7. FIG. 5 is the main routine representing the schematic operation of the temperature controller embodiment. After a power supply (not shown) is turned on, an initial operation is carried out in step 31. In step 32, a temperature operation is carried out, in which a process value detected by a temperature sensor is entered into CPU 12 through sensor input unit 11. In step 33, a control variable is calculated using a process value (i.e., the current temperature in the temperature controller embodiment) and a set or target point. In step 34, the calculated control variable is outputted through output unit 18 and used in a controlled process. The above operations of steps 32 to 34 are then reiterated.

Figure 6:
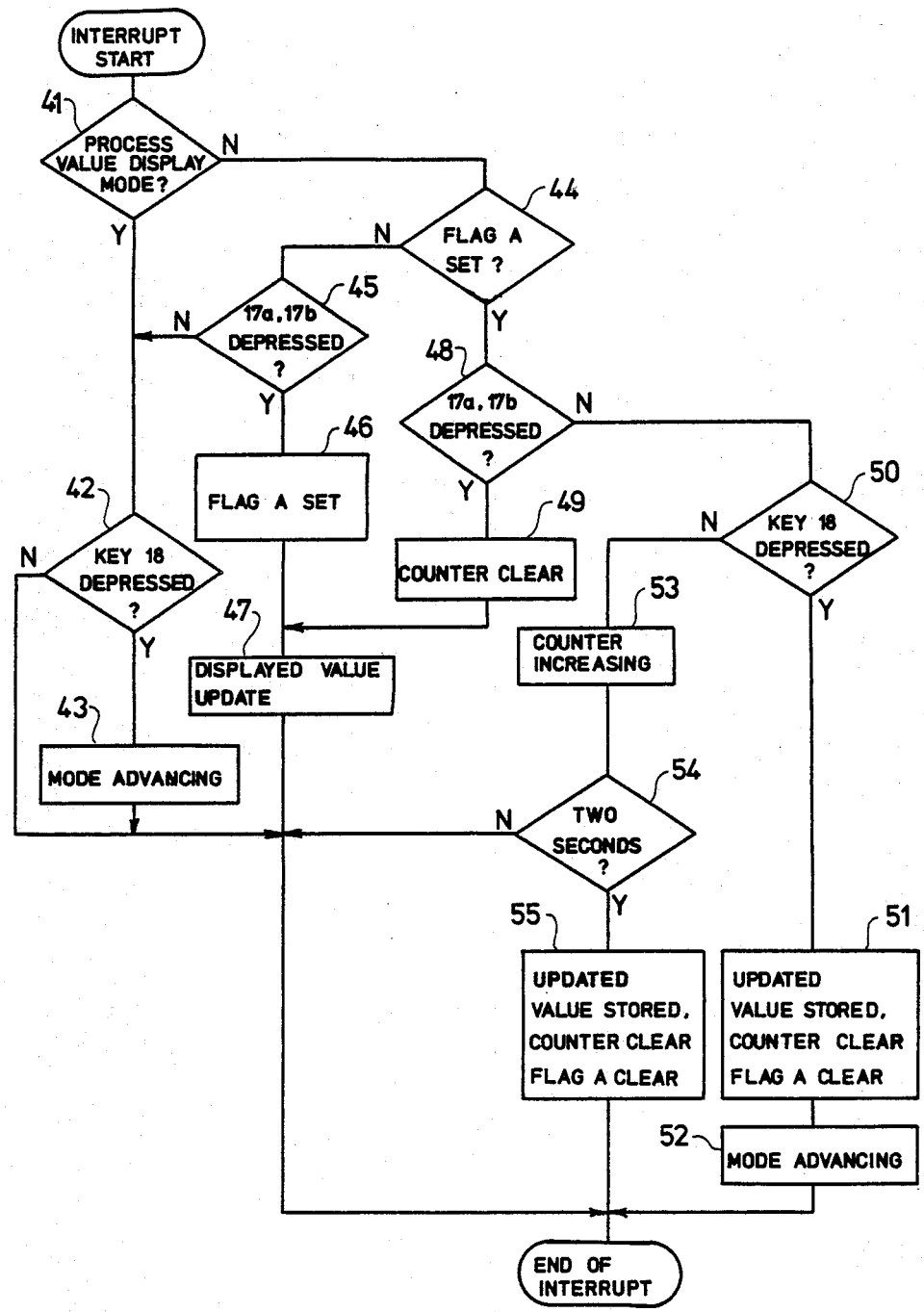
FIG. 6 is a flow chart representing the detailed operations of FIG. 5.

An interrupt operation shown in FIG. 6 is carried out repetitively at a time interval of 10 ms during the abovedescribed main routine. In step 41, a current display mode is checked to determine whether or not it is a process value (current temperature) display mode. If the current mode is found to be the process value display mode, mode changing key 18 is checked in step 42 to determine whether or not it has been depressed. If key 18 is found to be depressed, a mode advancing operation shown in FIG. 7 is carried out so that the set point and alarm point are displayed in turn. If key 18 is not depressed, the interrupt operation is terminated without performing the mode advancing operation. If the current mode is not the process value display mode, a flag A (indicating the status of numeral updating unit 17) is checked in step 44 to determine whether or not it is set. If flag A is not set, numeral updating keys 17a and 17b are checked in step 45 to determine whether or not they are depressed. If one of keys 17a and 17b is found to be depressed, flag A is set in step 46. Then, in step 47, a value stored in the input buffer is updated according to the status of keys 17a and 17b. In other words, the value is decremented if key 17a is depressed, and incremented if key 17b is depressed. The updated value is then displayed on display area 15a. At this point, the interrupt operation is terminated. If in step 45 it is determined that neither of keys 17a and 17b is depressed, the operation returns to step 42 and continues as described above. If flag A is found to be set in step 44, keys 17a and 17b are checked in step 48 to determine whether or not they are depressed. If they are found to be depressed, the counter in RAM 14 is cleared in step 49. Steps 44 to 49 show the operation of a key pushing identification means 5 which determines at a predetermined time interval whether or not keys 17a and 17b are pushed.

On the other hand, if keys 17a and 17b are found not to be pushed in step 48, CPU 12 goes to step 50 to check whether or not mode changing key 18 is depressed. If mode changing key 18 is found to be pushed, numeral updating key 17a or 17b is used to update a value stored in the input buffer. Then, the updated value in the input buffer is stored as a value for a new mode in step 51. More particularly, if the current mode is the set point display mode, the value in the input buffer is stored in the set point area. And if the current mode is the alarm point display mode, the value in the input buffer is transferred to the alarm point area. Further, in step 51 flag A and the counter are cleared. Then, CPU 12 goes to step 52 to carry out the mode advancing operation (shown in FIG. 7 and discussed in detail below) followed by the termination of the interrupt operation.

However, if mode changing key 18 is found not to be depressed in step 50, the value in the counter area of the RAM is increased in step 53, and then in step 54 the counter value is checked to determine whether or not it is larger than a predetermined value corresponding to, for example, two seconds. If the counter value is found to be smaller than the predetermined value, CPU 12 identifies that a new value is being set and terminates the interrupt operation. In contrast, if the counter value is found to be equal to or larger than the predetermined value, CPU 12 identifies that a value updated by key 17a or 17b is a new set value. Therefore, the same operation as that in step 51 is carried out in step 55. Then, the main operation is repeated with the new set or alarm point after the termination of the interrupt operation. Thus, steps 50 to 55 show the operation of a value changing means 6 which sets a set value when a predetermined time elapses after key 17a or 17b is depressed or when mode changing key 18 is pushed.

FIG. 7 is a flow chart showing the mode changing operation. According to FIG. 7, each push of mode changing key 18 sequentially changes the display mode, for example, from the process value display mode to the set point display mode, from the set point display mode to the alarm point display mode or from the alarm point display mode to the process value display mode.

The above description and the accompanying drawings are merely illustrative of the application of the principles of the present invention and are not limiting. Numerous other arrangements which fall within its spirit and scope may be readily devised by those skilled in the art. Accordingly, the invention is not limited by the foregoing description, but only limited by the scope of the appended claims.

We claim:

1. A physical quantity controller, comprising:
a display means including a numeral display area for displaying a numeral thereon;
a numeral updating means for updating a numeral displayed on said numeral display area;
a mode changing means for changing display modes of said display means;
a storage means including (i) an input buffer for temporarily storing a numeral updated by said updating means, (ii) a counter for counting time elapsing after said numeral updating means has been actuated, and (iii) a storage area for storing a value relating to said physical quantity; and
a writing means for writing said updated numeral stored in said input buffer into said storage area as a new value when said counter reaches a predetermined number after said numeral updating means has been actuated.

2. The controller as in claim 1, further comprising an identifying means for identifying whether or not said numeral updating means has been actuated.

3. The controller as in claim 1, wherein said writing means is a central processing unit.

4. The controller as in claim 1, wherein said storing area includes a first area for storing a process value representing a current value of said physical quantity, a second area for storing a set point representing a target value for said physical quantity, a third area for storing an alarm point representing an alarm value for said physical quantity, and a flag area for indicating whether or not said numeral updating means has been actuated.

5. The controller as in claim 1, wherein said numeral updating means includes a first key for decrementing a value stored in said input buffer, a second key for incrementing a value stored in said input buffer, and a third key for changing display modes of said display means.

6. The controller as in claim 5, further comprising a panel including marks "C", "∨", and "∧" respectively disposed adjacent to said first key, said second key and said third key.

7. The controller as in claim 1, wherein said display means further includes an "SP" mark for displaying an indication that a set point is displayed on said numeral display area, and an "AL" mark for displaying an indication that an alarm point is displayed on said numeral display area.

* * * * *